(12) United States Patent  (10) Patent No.: US 7,628,243 B2
Kleban  (45) Date of Patent: Dec. 8, 2009

(54) EQUAL RESPONSE AXLE

(76) Inventor: Hank Kleban, 660 Cokesbury Rd., Lebanon, NJ (US) 08833

( * ) Notice: Subject to any disclaimer, the term of this patent is extended or adjusted under 35 U.S.C. 154(b) by 0 days.

(21) Appl. No.: 09/800,871

(22) Filed: Mar. 7, 2001

(65) Prior Publication Data

US 2002/0153191 A1    Oct. 24, 2002

Related U.S. Application Data

(60) Provisional application No. 60/187,766, filed on Mar. 8, 2000.

(51) Int. Cl.
*B60K 17/16* (2006.01)
(52) U.S. Cl. ..................................... 180/375
(58) Field of Classification Search ............... 180/375, 180/337, 342; 280/124.103, 124.03; 301/124.1, 301/137

See application file for complete search history.

(56) References Cited

U.S. PATENT DOCUMENTS 5,752,575 A * 5/1998 Konishi et al. ............... 180/76

* cited by examiner

*Primary Examiner*—Faye M. Fleming
(74) *Attorney, Agent, or Firm*—Richard A Joel, Esq

(57) ABSTRACT

Equal response rear axles ("kera" axles) for vehicles having a front engine and rear wheel drive comprises a left and right rear axle which are sized to different predetermined dimensions. Conventionally, torque is delivered to the rear wheels unequally since the right side axle is longer than the left side axle, yet both axles have the same diameter in their effective length. The equal response axles are dimensioned based upon a formula for calculating spring rates or torsion bars. The calculations includes using the static loaded radius the dimension form the center of the axle to the ground and using either static or dynamic weight on the tire, that is the portion of the tire which is flat on the ground.

5 Claims, 2 Drawing Sheets

EQUAL RESPONSE AXLE

CROSS-REFERENCE TO RELATED APPLICATIONS

This application is based upon provisional application Ser. No. 60/187,766 filed on Mar. 8, 2000.

STATEMENT REGARDING FEDERALLY SPONSORED RESEARCH OR DEVELOPMENT

Research and development of the present invention and application have not been federally sponsored, and no rights are given under any Federal program.

REFERENCE TO A MICROFICHE APPENDIX

Not applicable.

BACKGROUND OF THE INVENTION

1. Field of the Invention

This invention relates to particularly sized axles ("kera axles") for vehicles having front engines and rear wheel drive. The axles are formula sized so that the shorter left axle has a smaller diameter than the longer right axle.

2. Description of the Related Art Including Information Disclosed Under 37 CFR §§1.97-1.98

In most automobiles that have front engine and rear wheel drive (non-independent suspension) there is a problem with having the torque delivered to the 2 rear wheels unequally. This is caused in most part by the instantaneous weight transfer to the left rear wheel and the fact that the right side axle is longer than the left side, yet both have the same diameter in the effective length of the axle. The fact that the left side axle is shorter with the same diameter means that the left rear wheel will lose traction first under hard acceleration because the shorter axle has a higher spring rate (torsionally stiffer) and the longer axle will twist slightly before spinning the wheel. This applies to all front engine cars with live rear axles with centered pinions. Applicant sees an application for a method of equalizing the torque at the tire contact patch by machining the left and right axles to different dimensions based on a formula used in calculating spring rates (torsional stiffness) of torsion bars. In applicant's calculations, applicant uses the static loaded radius (dimension from center of axle to ground) using either static or dynamic weight on the tire (portion of tire is flat on ground).

On high performance or racing cars in oval track racing and road racing, there are several ways of tuning the chassis to handle and have a neutral handling chassis. This means eliminating under-steering. While you are turning left in a left hand corner, the car wants to go straight to some degree. You also want to eliminate over-steering, which is when you turn left and the rear end comes around (spin out). You can tune the chassis by 1) increasing or decreasing the suspension spring rates at any corner of the car; 2) increasing or decreasing the weight on any wheel; 3) increasing or decreasing the anti-roll bar diameter on the front or rear of the car; 4) increasing or decreasing the circumference of either driving wheel (stagger). These are all ways that you can make large changes in handling characteristics but none of them match applicant's sized axles.

SUMMARY OF THE INVENTION

This invention relates to equal response rear axles ("kera" axles) for vehicles having a front engine and rear wheel drive. The subject axles comprise left and right rear axles that are sized to different predetermined dimensions. Conventionally, torque is delivered to the rear wheels unequally since the right side axle is longer than the left side axle, yet both axles have the same diameter in their effective length. The equal response axles are dimensioned based upon a formula for calculating spring rates or torsion bars. The calculations includes using the static loaded radius, the dimension from the center of the axle to the ground and using either static or dynamic weight on the tire, that is the portion of the tire which is flat on the ground.

Accordingly, an object of this invention is to provide a new and improved rear axle design for rear wheel vehicles.

Another object of this invention is to provide a new and improved rear axle wherein the left rear axle has a predetermined shorter diameter than the right rear axle.

A further object of this invention is to provide a formula sized rear axle, which minimizes the possibility of spinning out on turns.

A more specific object of this invention is to provide a longer right rear axle and a shorter left rear axle wherein the left axle has a smaller diameter based upon the static loaded radius and using either the static or dynamic weight of the tire.

BRIEF DESCRIPTION OF THE DRAWINGS

The above and other objects and advantages of this invention may be more clearly seen when viewed in conjunction with the accompanying drawings wherein.

DETAILED DESCRIPTION OF THE INVENTION

Figure 3:
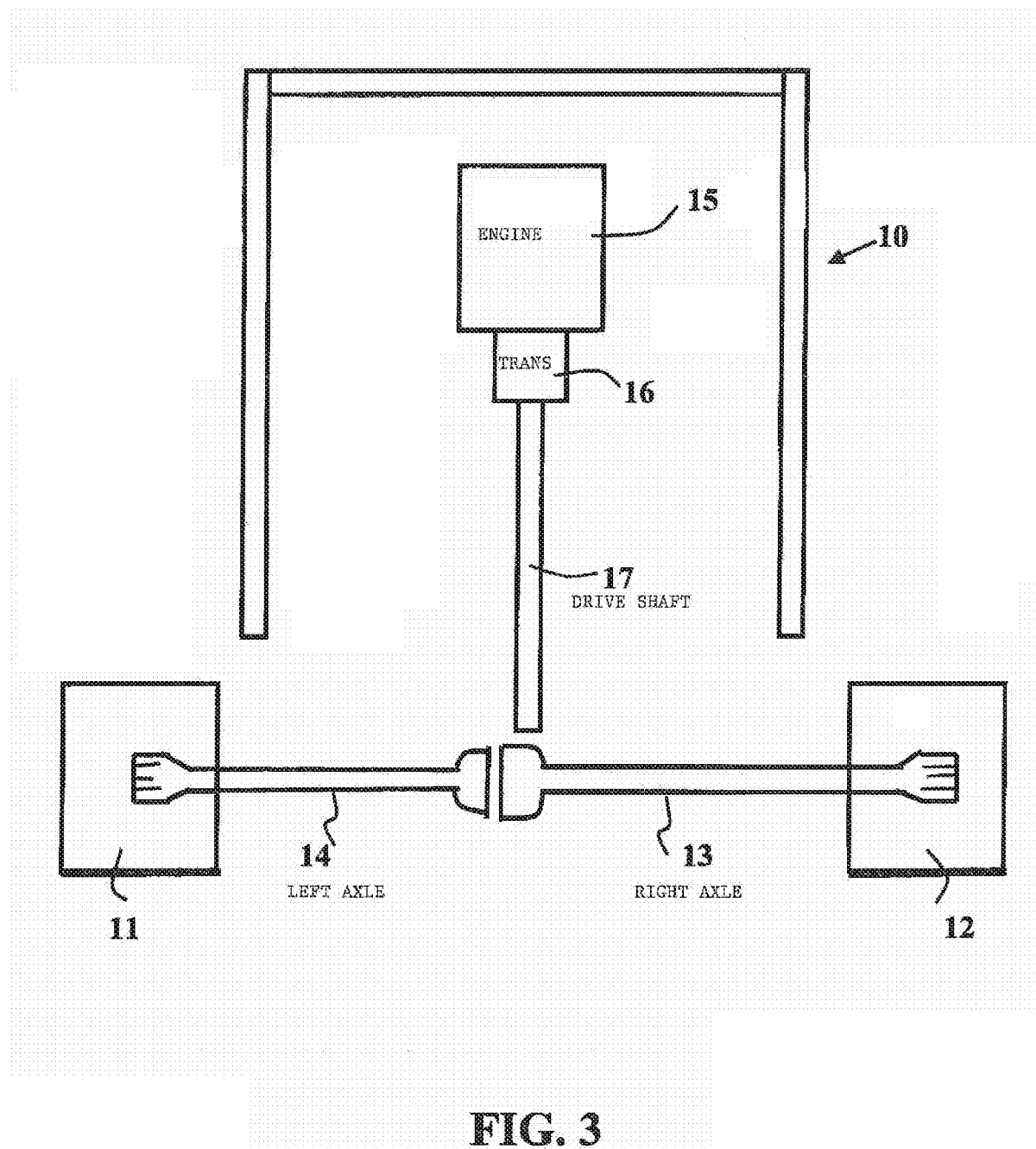

This invention relates to equal response axles for vehicles 10 having a front engine 15 and a rear wheel drive (non-independent suspension) and is particularly suited for use on racing cars. The invention involves a method and design for equalizing the torque at the tire contact patch. As shown in FIG. 3, the engine 15 is connected through a transmission 16 to a drive shaft 17 which drives the rear axels 13 and 14. In racecars, the right rear axle 13 is normally slightly longer than the left rear axle 14 and this creates problems particularly on turns.

Accordingly, the right and left axles 13 and 14 respectively are machined to different dimensions based on a formula for calculating spring rates (torsional stiffness) of torsion bars. "Spring rate" is defined as the amount of force required to move a torsion arm one inch. The intention is to have the same spring rates on each axle 13 and 14. Basically, the calculation uses the static loaded radius (dimension from center of axle to ground) using either static or dynamic weight on the tire (portion of tire flat on the ground).

Figure 1:
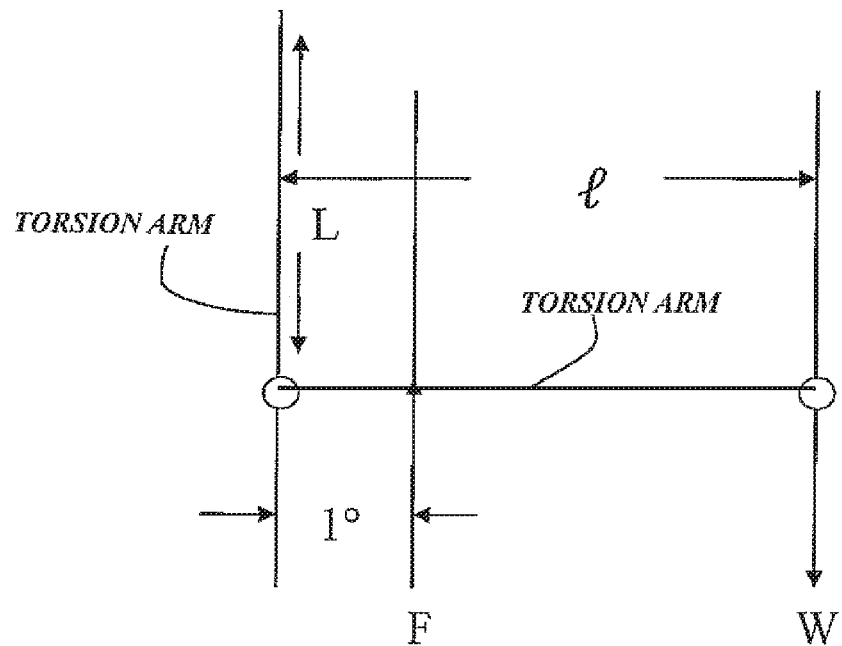
FIG. 1 is a representation of the dimensions employed in Step 2 of the detailed description.

FIG 1 depicts a weight W being applied to the torsion arm at a distance $\lambda$ which results in a 1° twist in the torsion bar having an effective length L.

Figure 2:
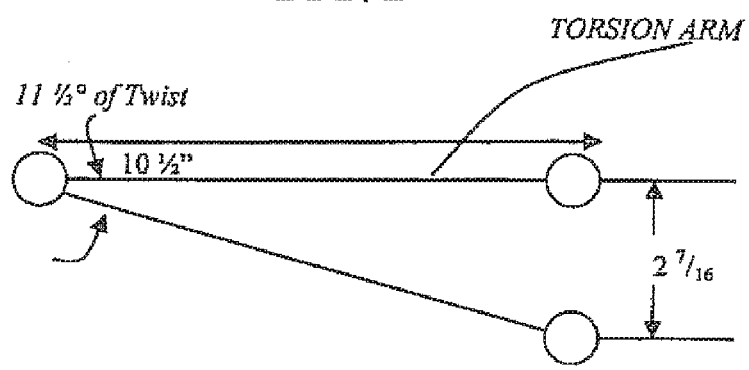
FIG. 2 is a diagrammatic view of the elements of Step 5 in the detailed description; and, FIG. 3 is a schematic top view of a vehicle with the unique axles.

FIG. 2 illustrates a 10½ torsion arm which deflects 2/7;16 under the load W which can be assumed as 500 pounds. The angle of twist is 1 1/1;2° where $\lambda$ equals 10/1;2 ". The resultant spring rate is 205 inch pounds. While various assumptions have been made to determine the spring rate, variations in the spring rate occur without affecting the theory of this invention.

In Step 1, the polar moment of inertia (1) for a tubular bar is calculated as follows:

Step 1

| Solid Bar | Tubular Bar |
|---|---|
| $J = \dfrac{\Pi D}{32}$ | $J = \dfrac{\Pi(D_1^4 - D_2^4)}{32}$ | where
J = Polar moment of inertia
D = Diameter of bar
$D_1$ = outer diameter
$D_2$ = inner diameter In Step 2, reference should be made to FIG. 1 for the various parameters.

Step 2

$$F = \frac{W \times L}{L}$$

where
F=T
F=force
T=torque
λ=lever length of torsional arm
W=weight or load

Step 3

$$\theta = \frac{T \times L}{G \times J}$$

where
W=a select weight
F=force in pounds
T=torque in pounds
J=polar moment
G=modulus of elasticity in shear (PSI)
L=working length-effective length (part of the bar that twists)
λ=lever length of torsion arm when used for axels. Static loaded radius is the lever length
θ=angle of twist in radians Note:
(1) For W use 500 pounds for 1 inch or larger bars-the more weight used the larger the movement of the given bar and the easier to measure
(2) Use 10,750,000 for G with 4140 steel
(3) Answer will be in radians Step 4
Multiply the answer in Step 3 by 57.3=Degrees of twist; used to convert angle of twist in radians to degrees of twist.

Refer to FIG. 2 for an understanding of Step 5

Step 5
(a) Draw a line using torsion arm length.
(b) Draw a second line of the same length representing degrees of twist.
(c) Divide the load by the distance (deflection).

Step 6
Divide the load by the distance to obtain the spring rate-spring rate equals the amount of force to move the end of the arm (given length) on a bar (given length) a certain distance

| Load = W = 500 Distance = 2 7/16 | $\dfrac{L}{D} = \dfrac{500}{2\ 7/16} = 205$ inch pounds |
|---|---|

Using the above formula to dimension the rear axles on high performance or racing cars overcomes the problems associated with an unequal response as torque is delivered unequally to the rear wheels 11 and 12. The problems are caused by the instantaneous weight transfer to the left rear wheel 11 and the fact that the right side axle 13 is longer than the left side 14, yet both conventionally have the same diameter in the effective length of the axle. The fact that the left side axle is shorter with the same diameter as the right side axel means that the left side axel has a higher spring rate. This means that the left rear wheel 11 will lose traction first under hard acceleration. The longer axle will twist slightly before spinning the wheel 12. If the right and left axles 13 and 14 are machined to different dimensions determined by the foregoing formulas the problems are overcome. This invention uses the static loaded radius (dimension from center of axle to ground as the lever or arm length of the axel which is a torsion bar) using either straight static or curved dynamic weight on the tire. For tuning purpose even a smaller diameter axel can also be used to help the car turn the more or less under acceleration. The axles are used as tuning devices for the handling of the car.

If you are going through a left hand corner and the car has a slight under steer, a softer (smaller diameter) left rear axle 14 can fix this problem. Also, with the smaller diameter left rear axel 14 you are better able to negotiate right hand corners under power without spinning out. There is a torque reaction that takes weight off the right rear wheel 12 and applies it to the left rear wheel 11 on all solid rear axel suspensions. This will result in more grip on the racetrack.

The weight transfer going through a right hand corner is also transferring weight to the left side wheels 11 together. This is loading up the left rear wheel 11 to the point where spinning out becomes all too easy. However, with the proposed "Kera" axles, if you choose to replace the left rear axle 14 with a smaller diameter, (softer spring rate in twist), the instantaneous weight transfer can be softened (absorbed) in the twisting action of the axle 14 which will result in more grip on the race track.

Applications particularly suited for the invention occur in oval track racing cars, open wheel cars, road racing cars, off road racing vehicles, high performance street cars, sport utility vehicles, pick-up trucks and commercial trucks and buses on all live axle rear wheel drive passenger cars.

In drag racing, the "Kera" sized axle will allow more even distribution of power under acceleration. Axle sizing is an excellent way of tuning the chassis under acceleration. The "kera" sized axle also helps prevent breakage of drive train parts.

The general advantages for all road vehicles include:
1) Less wheel spin under acceleration;
2) More even application of torque to drive wheels (even wear);
3) Less breakage in drive train;
4) Better response under starting acceleration;
5) Better grip when applying power through corner;

6) More even deceleration;

7) Better drive wheel tire wear.

Since applicant's invention is that to have two axles with the same spring rates and two different lengths, the axles must have different diameters. The right and left rear axles have fixed lengths. By calculating the spring rate for the right rear axle, which has a known diameter, the diameter of the left rear axle may be calculated using the same spring rate.

While the invention has been explained by a detailed description of certain specific embodiments, it is understood that various modifications and substitutions can be made in any of them within the scope of the appended claims, which are intended also to include equivalents of such embodiments.

What is claimed is:

1. An equal response rear axles for vehicles including a front engine and a rear wheel drive with a left wheel and a right wheel each having tires mounted thereon and a drive shaft coupled to the rear axles comprising:

a left rear wheel and a right rear wheel;

a right rear axle and a left rear axle connected to the right rear wheel and left rear wheel respectively at one end and to the drive shaft at the other end wherein the axles have the same effective length and wherein the left axle has a predetermined smaller diameter than the right axle to provide equal torque to the wheels.

2. An equal response rear axles for vehicles in accordance with claim 1 wherein:

the left axle is shorter and includes a smaller diameter than the right axle to provide equal torque to the wheels.

3. An equal response rear axles for vehicles in accordance with claim 1 wherein:

the diameter of the left axle is based upon the torsional stiffness of the axle to deliver torque to the left wheel that equals the torque delivered to the right wheel.

4. An equal response rear axles for vehicles in accordance with claim 1 wherein:

the smaller diameter of the left axle is sized using the static loaded radius from the left rear wheel from the center of the axle to the ground; and, to determine the diameter of the right side axel is determined by using the static loaded radius from the right rear wheel from the center of the axle to the ground.

5. An equal response rear axle for vehicles in accordance with claim 1 wherein:

the right rear axle and the left rear axle have the same spring rates.

\* \* \* \* \*